United States Patent
Ishikura et al.

(10) Patent No.: US 10,378,591 B2
(45) Date of Patent: Aug. 13, 2019

(54) PROPELLER SHAFT AND YOKE STRUCTURE OF UNIVERSAL JOINT USED FOR THE PROPELLER SHAFT

(71) Applicant: Hitachi Automotive Systems Kyushu, Ltd., Chikujo-gun, Fukuoka (JP)

(72) Inventors: Kenichiro Ishikura, Atsugi (JP); Hidekazu Aoki, Atsugi (JP); Hiromichi Komai, Hadano (JP)

(73) Assignee: Hitachi Automotive Systems Kyushu, Ltd., Fukuoka (JP)

( * ) Notice: Subject to any disclaimer, the term of this patent is extended or adjusted under 35 U.S.C. 154(b) by 0 days.

(21) Appl. No.: 15/789,808

(22) Filed: Oct. 20, 2017

(65) Prior Publication Data
US 2018/0038418 A1    Feb. 8, 2018

Related U.S. Application Data

(63) Continuation of application No. 15/414,071, filed on Jan. 24, 2017, now Pat. No. 9,850,959, which is a (Continued)

(30) Foreign Application Priority Data

May 29, 2013 (JP) .................................. 2013-112667

(51) Int. Cl.
*F16D 1/033* (2006.01)
*F16D 1/076* (2006.01)
(Continued)

(52) U.S. Cl.
CPC ............. *F16D 3/387* (2013.01); *F16D 1/076* (2013.01); *F16D 3/40* (2013.01); *F16D 1/033* (2013.01);
(Continued)

(58) Field of Classification Search
CPC . F16D 1/033; F16D 1/076; F16D 3/38; F16D 3/382; F16D 3/387; F16D 3/40;
(Continued)

(56) References Cited

U.S. PATENT DOCUMENTS 3,421,342 A * 1/1969 Rossiter .................... F16D 3/40
464/130
4,162,860 A   7/1979 Mengeringhausen et al.
(Continued)

FOREIGN PATENT DOCUMENTS

EP    2 006 554 A2    12/2008
FR    1232031 A  *  10/1960  ............. F16D 1/076
(Continued)

OTHER PUBLICATIONS

Japanese Office Action issued in counterpart Japanese Application No. 2013-112667 dated May 24, 2016 (three pages).
(Continued)

*Primary Examiner* — Josh Skroupa
(74) *Attorney, Agent, or Firm* — Crowell & Moring LLP (57) ABSTRACT

A propeller shaft includes a shaft part, a first yoke, a connecting portion, a first yoke portion, a first concave portion, and a second yoke having a flange and a second yoke portion. The flange has a bolt insertion hole into which a securing member is inserted, and is connected to a second shaft part of a vehicle side by the securing member. The second yoke portion is provided at the flange, and has a shape that extends in a direction of a rotation axis of the shaft part. A cruciform shaft couples the first yoke portion with the second yoke portion.

5 Claims, 7 Drawing Sheets

Related U.S. Application Data continuation of application No. 15/094,095, filed on Apr. 8, 2016, now Pat. No. 9,605,716, which is a continuation of application No. 14/287,350, filed on May 27, 2014, now Pat. No. 9,334,904.

(51) Int. Cl.
*F16D 3/40* (2006.01)
*F16D 3/38* (2006.01)

(52) U.S. Cl.
CPC ......... *F16D 3/405* (2013.01); *Y10T 403/1666* (2015.01)

(58) Field of Classification Search
CPC ............... F16D 3/405; Y10T 403/1616; Y10T 403/1624; Y10T 403/1666; Y10T 403/1674; Y10T 403/64–648
USPC ........ 464/134, 135, 182; 403/13, 14, 19, 20, 403/335–337
See application file for complete search history.

(56) References Cited

U.S. PATENT DOCUMENTS

| | | |
|---|---|---|
| 4,253,776 A | 3/1981 | Orain |
| 5,868,626 A | 2/1999 | Whitney |
| 6,131,850 A | 10/2000 | Hey et al. |
| 6,857,808 B1 | 2/2005 | Sugimoto et al. |
| 6,881,152 B2 | 4/2005 | Erlmann |
| 6,893,349 B2 | 5/2005 | Krugman et al. |
| 7,213,999 B2 | 5/2007 | Haas |
| 2013/0294822 A1 | 11/2013 | Raymond |

FOREIGN PATENT DOCUMENTS

| | | |
|---|---|---|
| GB | 2 006 923 A | 5/1979 |
| JP | 2008-208919 A | 9/2008 |

OTHER PUBLICATIONS

Japanese-language Office Action issued in counterpart Japanese Application No. 2013-112667 dated Jan. 24, 2017 (4 pages).

* cited by examiner

PROPELLER SHAFT AND YOKE STRUCTURE OF UNIVERSAL JOINT USED FOR THE PROPELLER SHAFT

CROSS REFERENCE TO RELATED APPLICATIONS

This application is a continuation of U.S. application Ser. No. 15/414,071, filed Jan. 24, 2017, which is a continuation of U.S. application Ser. No. 15/094,095, filed Apr. 8, 2016, now U.S. Pat. No. 9,605,716 issued on Mar. 28, 2017, which is continuation of U.S. application Ser. No. 14/287,350, filed May 27, 2014, now U.S. Pat. No. 9,334,904, issued on May 10, 2016, which claims priority from Japanese Patent Application No. 2013-112667, filed on May 29, 2013, the disclosures of which are expressly incorporated by reference herein.

BACKGROUND OF THE INVENTION

The present invention relates to a propeller shaft, for instance, for a vehicle, and also relates to a yoke structure of a universal joint used for the propeller shaft.

As a related art propeller shaft, Japanese Patent Provisional Publication No. 2008-208919 (hereinafter is referred to as "JP2008-208919") discloses the propeller shaft.

As is known in the art, this propeller shaft is a propeller shaft that transmits a driving force of an engine, which is outputted from a transmission mounted on a front side of a vehicle, to a differential gear mounted on a rear side of the vehicle. The propeller shaft and the transmission are coupled together by the fact that a yoke of a universal joint provided at a front end portion of the propeller shaft and a connecting member provided at a top end portion of an output shaft of the transmission are connected by tightening of bolt and nut.

The yoke has a substantially rectangular mounting flange in which four bolt insertion holes are formed at four corners and has a pair of yoke portions having a bifurcated shape which protrude from one side surface of the mounting flange. On the other hand, the connecting member has a substantially circular flange portion that is made abut on or touches the mounting flange from an axial direction. Four bolts, e.g. four stud bolts, which are inserted into the four bolt insertion holes are fixed to this flange portion at four points in a circumferential direction of the flange portion. The yoke of the propeller shaft and the connecting member of the output shaft of the transmission are connected, through the mounting flange of the yoke and the flange portion of the connecting member, by screwing the nut onto the stud bolt and tightening it using a turning tool (a tightening tool), e.g. a socket wrench.

SUMMARY OF THE INVENTION

In recent years, weight reduction and commonality of components have been achieved, also sizes of the transmission and the differential gear, which each of both ends of the propeller shaft is connected to, have been reduced. In response to this trend, each bolt circle diameter of the mounting flange at the propeller shaft side and the flange portion of the connecting member at the transmission side, namely a circle diameter of the stud bolt and a circle diameter of the bolt insertion hole, become smaller.

Because of this size reduction of the bolt circle diameter, a fixing position of each stud bolt and a forming position of each bolt insertion hole are shifted to an axial center of the yoke, and a gap or clearance between the nut and a side surface of the yoke portion is limited or restrained. Then, when inserting the socket wrench onto the nut, the socket wrench interferes with the side surface of the yoke portion, thus this causes difficulty in inserting or fitting the socket wrench to the gap.

Further, even if the socket wrench can be inserted or fitted to the gap, since the socket wrench requires pulling out linearly along a long length of an axial direction of the bolt when detaching the socket wrench, the detaching work is also difficult. These difficulties in inserting and detaching the socket wrench result in efficiency and workability of a connecting work (fastening or tightening work) of the propeller shaft decreasing.

It is therefore an object of the present invention to provide a propeller shaft and a yoke structure of a universal joint used for the propeller shaft which are capable of increasing efficiency and workability of a connecting work of the propeller shaft.

According to one aspect of the present invention, a propeller shaft comprises: a first yoke having; (a) a fixing portion fixed to a shaft part; (b) a pair of first yoke portions having a bifurcated shape that extends from one end portion of the fixing portioning an axial direction; and (c) a first bearing hole formed at a top end portion of each first yoke portion and securing therein a first bearing that holds a cruciform shaft; a second yoke coupled to the first yoke through the cruciform shaft and secured to a predetermined member, the second yoke having; (d) a mounting flange; and (e) a bolt insertion hole formed at the mounting flange, a bolt to secure the second yoke to the predetermined member being inserted into the bolt insertion hole; and a securing member securing the mounting flange of the second yoke to the predetermined member through the bolt by a fastening tool, and a first concave portion to slide there on an outer circumferential surface of the fastening tool is provided at each first yoke portion.

According to another aspect of the present invention, a propeller shaft comprises: a ball yoke having; (a) a cylinder portion whose one end is fixed to a shaft part; (b) a pair of first yoke portions having a bifurcated shape that extends from one end portion of the cylinder portion in an axial direction, each first yoke portion being provided at a top end portion thereof with a bearing hole securing a bearing that holds a cruciform shaft; a flange yoke coupled to the ball yoke through the cruciform shaft and secured to a predetermined member, the flange yoke having; (c) a flange; and (d) a bolt insertion hole formed at the flange, a bolt to secure the flange yoke to the predetermined member being inserted into the bolt insertion hole; and a nut screwed onto the bolt from a flange yoke side by a fastening tool, and a first concave portion to slide thereon an outer circumferential surface of the fastening tool is provided at a side surface of each first yoke portion along an axial direction of the bolt inserted into the bolt insertion hole.

According to a further aspect of the invention, a yoke structure of a universal joint comprises: a fixing portion fixed to a shaft part of a propeller shaft; a pair of bifurcated yoke portions extending from the fixing portion in an axial direction; and a bearing hole formed at each yoke portion and securing therein a bearing that holds a cruciform shaft, and the yoke portion is provided with a concave portion that suppresses an interference of an outer circumferential surface of a fastening tool that fastens a nut and a bolt for securing the propeller shaft to a connecting member on a vehicle side with a side surface of the yoke portion.

According to the present invention, especially when detaching or pulling out the fastening tool from the securing member after fastening the securing member, the interference of the outer circumferential surface of the fastening tool with the side surface of the first yoke portion can be suppressed.

The other objects and features of this invention will become understood from the following description with reference to the accompanying drawings.

DETAILED DESCRIPTION OF THE INVENTION

Embodiments of a propeller shaft and a yoke structure of a universal joint used for the propeller shaft of the present invention will be explained below with reference to the drawings. In the embodiments, the propeller shaft is applied to a vehicle.

First Embodiment

Figure 1:
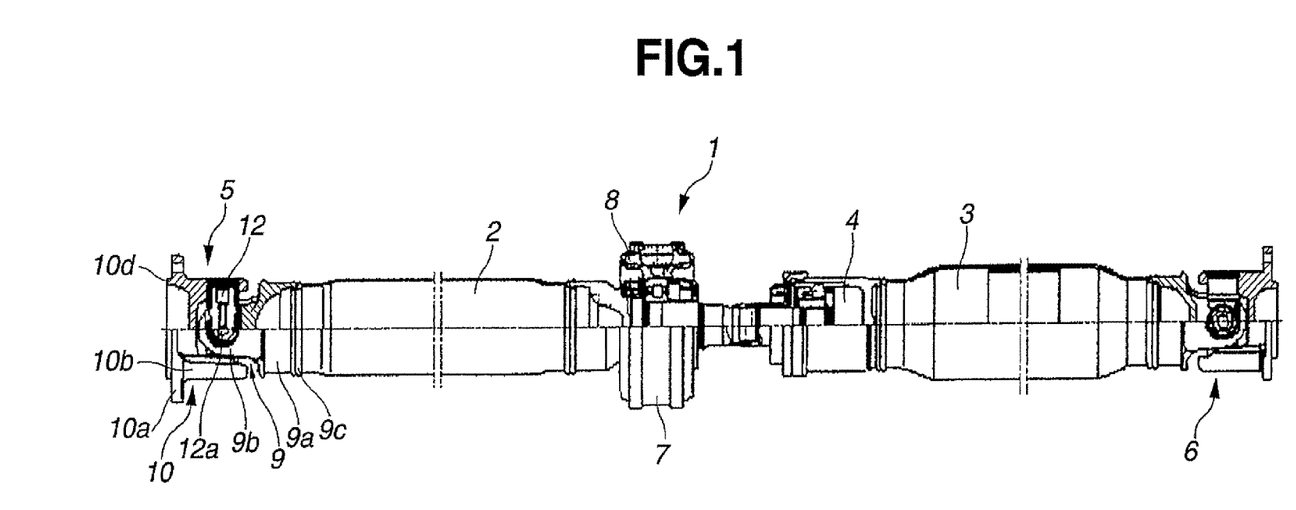
FIG. 1 is general view of a propeller shaft of the present invention.

As shown in FIG. 1, a propeller shaft 1 has a structure in which a first shaft part 2 on a vehicle front side and a second shaft part 3 on a vehicle rear side are coupled together through a constant velocity universal joint 4 provided at a front end portion of the second shaft part 3.

This propeller shaft 1 is coupled to an output shaft of a transmission (not shown) through a first universal joint 5 provided at a front end portion of the first shaft part 2. On the other hand, the propeller shaft 1 is coupled to an input shaft of a differential gear (not shown) through a second universal joint 6 provided at a rear end portion of the second shaft part 3, and is set so as to be able to wobble or rock in up-and-down directions and right-and-left directions of the vehicle.

The propeller shaft 1 is rotatably supported by a center bearing 7 provided between the first shaft part 2 and the constant velocity universal joint 4. Further, the propeller shaft 1 is supported and fixed to a floor bottom of the vehicle through a supporting member 8 that is secured to the center bearing 7. General bending or flexure of the propeller shaft 1 is suppressed by such a supporting and fixing structure.

The first universal joint 5 and the second universal joint 6 are a so-called cruciform universal joint. Although shapes of these first and second universal joints 5 and 6 connecting to the transmission at a front side of the propeller shaft 1 and the differential gear at a rear side of the propeller shaft 1 respectively are slightly different from each other, their basic structures are the same. Thus, in the following description, only the first universal joint 5 will be explained in detail.

Figure 2:
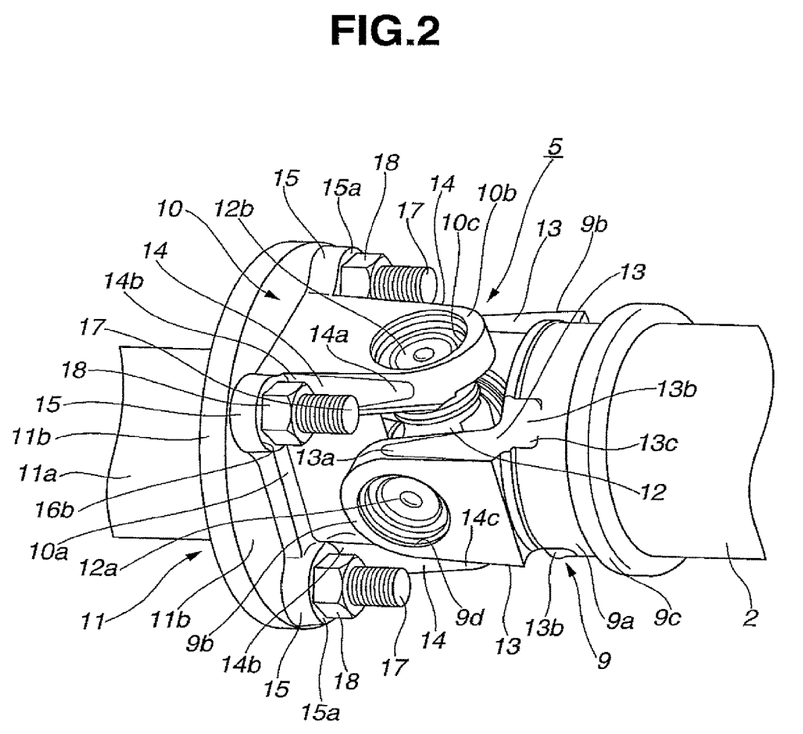
FIG. 2 is a perspective view of a first universal joint according to a first embodiment of the present invention.

As shown in FIG. 2, the first universal joint 5 mainly has a ball yoke 9 that is a first yoke fixed to the front end portion of the first shaft part 2, a flange yoke 10 that is a second yoke coupled to the output shaft of the transmission through a connecting member 11 (described later) and a cruciform shaft 12 that is installed between the yokes 9 and 10 and rockably supports these yokes 9 and 10 in the in up-and-down and right-and-left directions.

As can be seen in FIG. 2, the ball yoke 9 is formed by a cylinder portion 9a having a substantially same diameter as a front edge of the first shaft part 2 and a pair of first yoke portions 9b, 9b formed integrally with a top end of the cylinder portion 9a and having a bifurcated shape which protrude or extend along an axial direction. These cylinder portion 9a and first yoke portions 9b, 9b are formed as a single-piece component by casting.

The cylinder portion 9a is joined to the first shaft part 2 from the axial direction through friction welding of a rear end portion 9c and the front end portion of the first shaft part 2.

Each of the first yoke portions 9b, 9b is provided at both side surfaces thereof with a first depressed portion 13 that is a first hollow portion (or a first concave portion). This first depressed portion 13 is formed into an arc-shaped groove in cross section which is substantially same as an arc shape of an outer circumferential surface 19d (described later) of a socket wrench 19. Further, the first depressed portion 13 extends from a front end portion side of each first yoke portion 9b up to an almost middle position in the axial direction on an outer circumferential surface of the cylinder portion 9a. More specifically, as seen in FIG. 2, the first depressed portion 13 is formed so as to gradually spread (so as to gradually become wider) from a top end portion 13a at the front end side of the first yoke portion 9b up to a rear end portion 13b at the cylinder portion 9a side. A depth of the groove is formed so as to gradually become deeper from the top end portion 13a side according to a reverse taper angle of both side surfaces of the first yoke portion 9b, and a middle position in a width direction of the groove is deepest.

Figure 8:
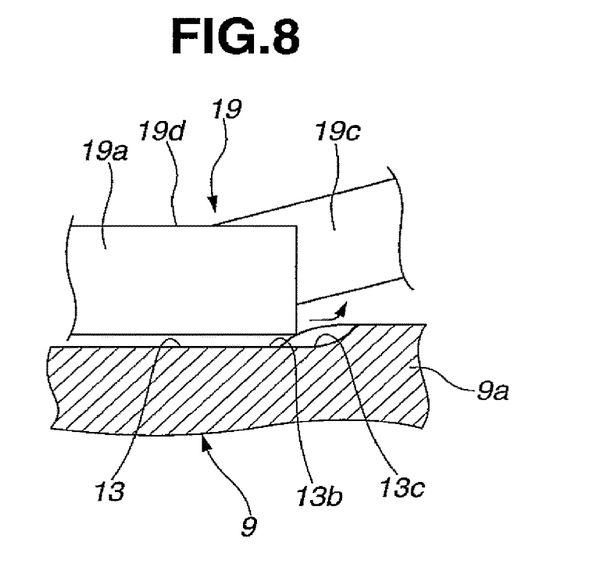
FIG. 8 is an enlarged view of a main part of A in FIG. 7 for explaining the connecting work of the propeller shaft according to the first embodiment.

Further, as shown also in FIG. 8, a rear edge of the rear end portion 13b at the cylinder portion 9a side, of the first depressed portion 13 is shaped into an inclined surface 13c having a reverse tapered shape which rises toward the outer circumferential surface of the cylinder portion 9a.

The inclined surface 13c (A circumferential direction of the inclined surface 13c) is formed so as to face toward the first yoke portion 9b in order for the outer circumferential surface 19d of the socket wrench 19 to escape (in order for the outer circumferential surface 19d of the socket wrench 19 to slide on the inclined surface 13c).

Each of the first yoke portions 9b, 9b is provided at a top end side thereof with a first bearing hole 9d that penetrates the first yoke portion 9b from an inner peripheral surface toward an outer peripheral surface of the first yoke portion 9b and opens in a radial direction. Then, a first bearing 12a that holds the cruciform shaft 12 is set inside the first bearing hole 9d. That is, the cruciform shaft 12 is held by two first bearings 12a, 12a set at the U-shaped top end side of the first yoke portions 9b, 9b.

On the other hand, as for the flange yoke 10, as shown in FIG. 2, in the same way as the ball yoke 9, the flange yoke 10 is formed as a single-piece component by casting. The flange yoke 10 has a mounting flange 10*a* and a pair of second yoke portions 10*b*, 10*b* formed integrally with a top end of the mounting flange 10*a* and having a bifurcated shape which protrude or extend along an axial direction. Each of the second yoke portions 10*b*, 10*b* is provided at a front side thereof with a second bearing hole 10*c* that penetrates the second yoke portion 10*b* from an inner peripheral surface toward an outer peripheral surface of the second yoke portion 10*b* and opens in a radial direction. Then, a second bearing 12*b* that holds the cruciform shaft 12 is set inside the second bearing hole 10*c*. That is, the cruciform shaft 12 is held by two second bearings 12*b*, 12*b* set at the U-shaped front side of the second yoke portions 10*b*, 10*b*.

In the same way as the first yoke portions 9*b*, 9*b*, each of the second yoke portions 10*b*, 10*b* is provided at both side surfaces thereof with a second depressed portion 14 that is a second hollow portion (or a second concave portion). This second depressed portion 14 is formed into an arc-shaped groove in cross section which is substantially same as an arc shape of an outer peripheral edge of a nut seating surface 15*a* (described later) (which is substantially same as the arc shape of the outer circumferential surface 19*d* of the socket wrench 19). Further, the second depressed portion 14 is formed along the axial direction from a front end portion of each second yoke portion 10*b* up to a position where the second depressed portion 14 faces the nut seating surface 15*a*. More specifically, as seen in FIG. 2, the second depressed portion 14 is formed so as to gradually spread (so as to gradually become wider) from a top end portion 14*a* at the front side of the second yoke portion 10*b* up to a rear end portion 14*b*. A depth of the groove is formed so as to gradually become deeper from the top end portion 14*a* side according to a reverse taper angle of both side surfaces of the second yoke portion 10*b*, and a middle position in a width direction of the groove is deepest.

Figure 3:
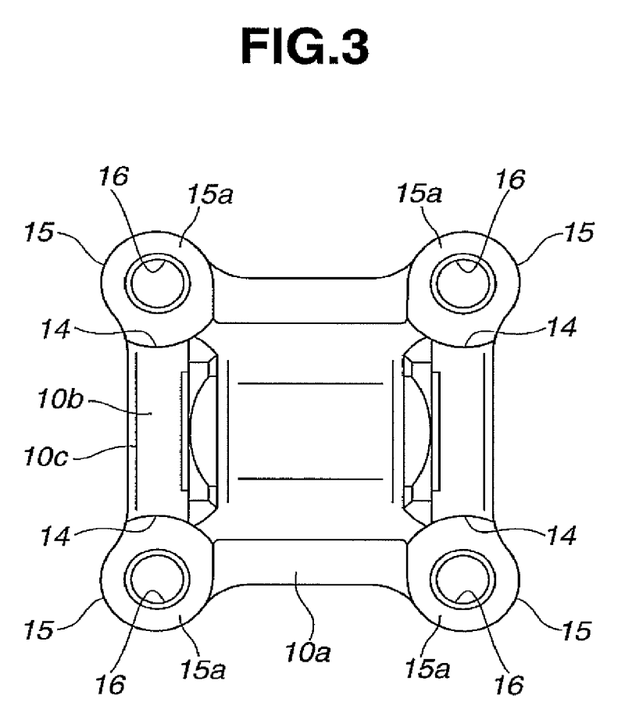
FIG. 3 is a front view of a yoke according to the first embodiment.

As shown in FIGS. 2 and 3, the flange yoke 10 has an almost rectangular shape, and is provided at four corners thereof with arc-shaped boss portions 15. Further, four bolt insertion holes 16 are formed in the middle of the respective boss portions 15, then a stud bolt 17 (described later) is inserted into this bolt insertion hole 16.

On one side surface of the boss portion 15 which faces the ball yoke 9, the flat nut seating surface 15*a* on which a nut 18 (a securing member, described later) is seated is formed. This nut seating surface 15*a* is formed so that the second depressed portion 14 faces the nut seating surface 15*a*.

On the other hand, on a back surface of the flange yoke 10, as shown in FIG. 1, a substantially ring-shaped annular protrusion 10*d* that is fitted in a ring groove (not shown) of a mounting plate 11*b* (described later) formed at the connecting member 11 is provided. By this fitting of the annular protrusion 10*d* and the ring groove of the mounting plate 11*b*, positioning when connecting the flange yoke 10 and the connecting member 11 is made.

The connecting member 11 has a substantially cylindrical shape as seen in FIG. 2. The connecting member 11 has a cylinder shaft portion 11*a* that connects to the output shaft of the transmission, the disk-shaped mounting plate 11*b* that is formed integrally with the cylinder shaft portion 11*a* at an end of the cylinder shaft portion 11*a* opposite to the flange yoke 10 and the four stud bolts 17 that protrude from a front end surface, on the flange yoke 10 side, of the mounting plate 11*b*.

The stud bolt 17 is previously fixed to four corner positions close to an outer circumferential edge of the mounting plate 11*b*. The mounting flange 10*a* and the mounting plate 11*b* are joined together by screwing the nut 18 onto the stud bolt 17 from a top side of a shaft portion of the stud bolt 17.

Figure 5:
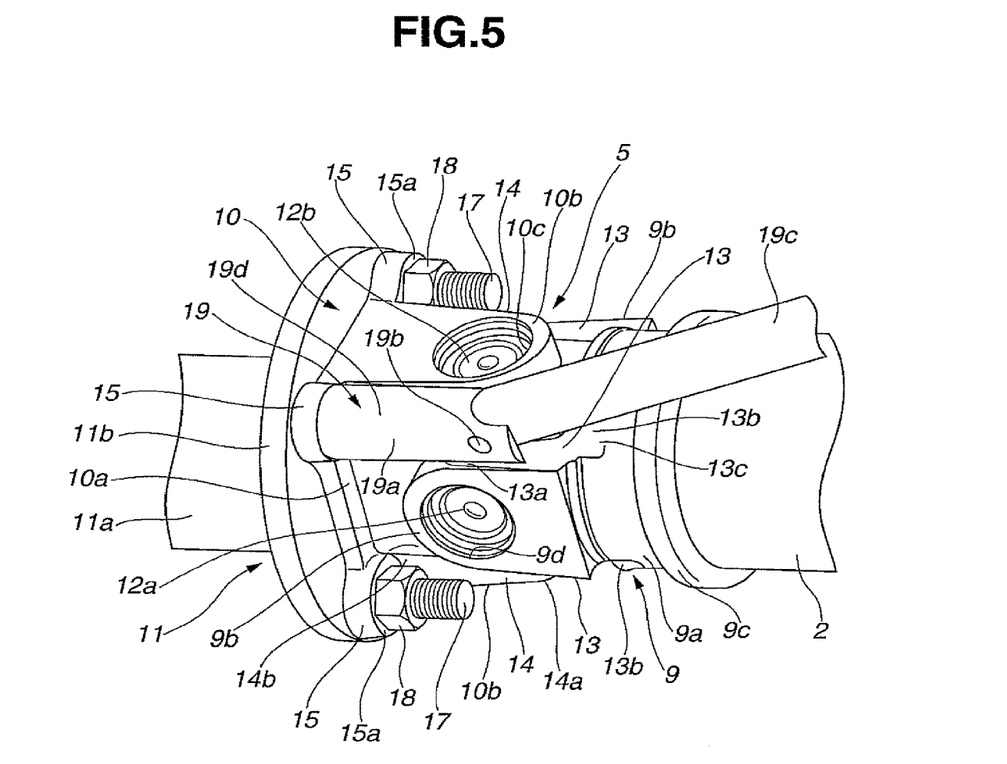
FIG. 5 is a perspective view for explaining the connecting work of the propeller shaft according to the first embodiment.

The socket wrench 19 as a turning tool (a tightening or fastening tool) to turn and tighten the nut 18 is formed, as shown in FIGS. 5 and 8, by a socket part 19*a* at a top side and a relatively long rod handle 19*c* rotatably connected to a rear end of the socket part 19*a* through a pivot pin 19*b*. The socket part 19*a* is cylindrical in shape, and its top end inside has a hexagonal surface that is fitted onto the nut 18.

Here, regarding the propeller shaft 1, each element or component of the propeller shaft 1 is previously assembled before the propeller shaft 1 is connected to the transmission etc. mounted on the vehicle, then finally the propeller shaft 1 is connected to the transmission and the differential gear.

Method of Connecting Propeller Shaft and Transmission

Figure 4:
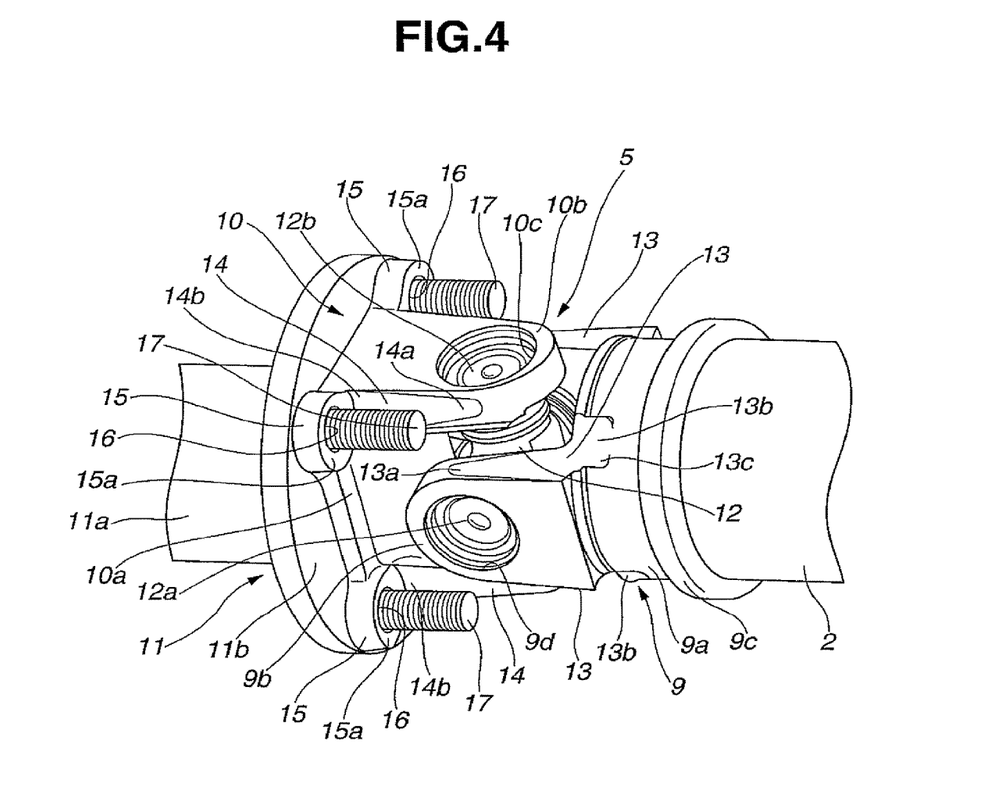
FIG. 4 is a perspective view for explaining a connecting work of the propeller shaft according to the first embodiment.

As a connecting method, as shown in FIG. 4, first, each stud bolt 17 of the mounting plate 11*b* is inserted into the bolt insertion hole 16 of the mounting flange 10*a*. Next, the nut 18 is screwed onto each stud bolt 17 by hand for temporal fixing until the nut 18 reaches and touches the nut seating surface 15*a*.

Figure 6:
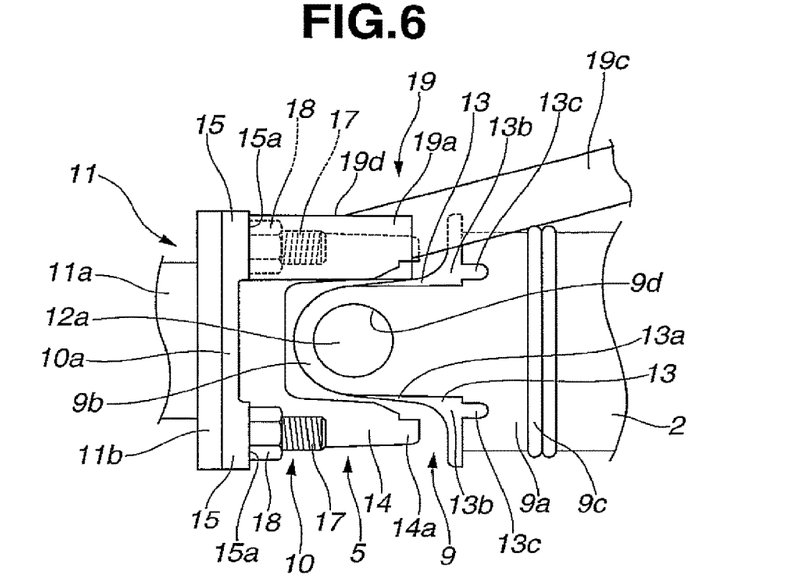
FIG. 6 is a side view for explaining the connecting work of the propeller shaft according to the first embodiment.

Subsequently, as shown in FIGS. 5 and 6, the socket part 19*a* of the socket wrench 19 is inserted and fitted onto the nut 18 screwed onto the stud bolt 17 from the top side of the stud bolt 17, and the top end of the socket part 19*a* is fitted onto the nut 18. At this time, the socket part 19*a* is inserted along the stud bolt 17 using the first and second depressed portions 13 and 14 of the first and second yoke portions 9*b* and 10*b*. That is, using a relatively large gap or clearance formed between inner surfaces of the arc-shaped grooves of the first and second depressed portions 13 and 14 and an outer peripheral surface of the stud bolt 17, the socket part 19*a* can be smoothly inserted.

Next, the socket wrench 19 is turned with the rod handle 19*c* rotated up to about 90° through the pivot pin 19*b*, then the nut 18 is tightened with a required or specified torque.

Figure 7:
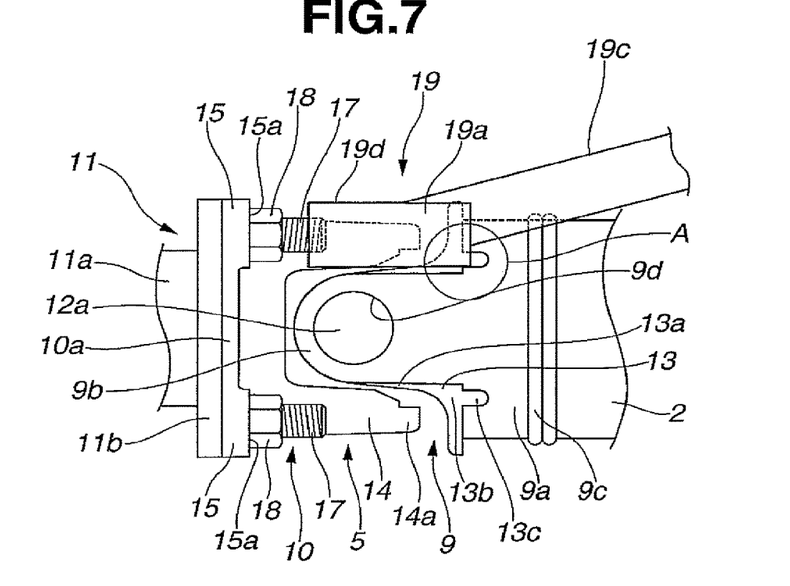
FIG. 7 is a side view for explaining the connecting work of the propeller shaft according to the first embodiment.

After tightening, the socket wrench 19 is pulled out in a direction of an arrow shown in FIGS. 7 and 8, namely, pulled out linearly along an axial direction of the stud bolt 17, and the socket part 19*a* is removed or separated from the nut 18. That is, the rod handle 19*c* is returned to the same axis as the socket part 19*a* through the pivot pin 19*b* and is pulled up linearly. At this time, since the socket part 19*a* and the rod handle 19*c* can be pulled out along the inner surfaces of the arc-shaped grooves of the first and second depressed portions 13 and 14, the socket wrench 19 can be smoothly pulled out or detached without interfering with any side surface of the first and second yoke portions 9*b* and 10*b*.

Especially when the socket wrench 19 can not easily be detached from the nut 18 due to the fact that the inside hexagonal surface of the socket part 19*a* is jammed onto or engaged with a hexagonal surface of the nut 18 after tightening the nut 18 with the specified torque, this structure is effective in the event that the whole socket wrench 19 is pulled up in a vertically upward direction while being pulled out along a long length of the axial direction of the stud bolt 17.

Afterwards, likewise, the socket wrench 19 can easily be inserted and fitted onto and detached from the other three nuts 18. The method described above facilitates a connecting work (or a tightening work) of the mounting flange 10*a* on the propeller shaft 1 side and the mounting plate 11*b* on the transmission side. Efficiency and workability of the connecting work can be therefore increased.

As for the connection between the propeller shaft 1 and the differential gear, since it is done by the same connecting method, its explanation will be omitted here.

As explained above, according to the present embodiment, since the first and second depressed portions 13 and 14 formed on the both side surfaces of the first and second yoke portions 9*b* and 10*b* can be used as an escape groove (or a sliding groove) when inserting and detaching the socket wrench 19, it is possible to suppress the interference of the socket wrench 19 with the both side surfaces of the first and second yoke portions 9*b* and 10*b*, thereby allowing the smooth inserting and detaching work of the socket part 19*a*.

Further, since the first and second depressed portions 13 and 14 have the arc-shaped groove which is substantially same as the arc shape of the outer circumferential surface 19*d* of the socket part 19*a*, when inserting and detaching the socket part 19*a* of the socket wrench 19, the first and second depressed portions 13 and 14 serve as a guiding portion for the socket wrench 19. Thus the smooth inserting and detaching work can be achieved.

Furthermore, since the first depressed portion 13 has the inclined surface 13*c* having the reverse tapered shape from a front edge of the cylinder portion 9*a* toward the middle position in the axial direction on the outer circumferential surface of the cylinder portion 9*a*, when detaching the socket part 19*a* of the socket wrench 19 from the nut 18, the inclined surface 13*c* serves as a guiding portion that guides the socket wrench 19 in a pulling-out direction. Thus the smooth detaching work can be achieved.

Moreover, since the reverse tapered-shaped inclined surface 13*c* located at the rear edge of the rear end portion 13*b* of the first depressed portion 13 rises toward the outer circumferential surface of the cylinder portion 9*a*, the interference of the socket wrench 19 with the cylinder portion 9*a* when pulling out the socket wrench 19 is avoided. It is therefore possible to decrease a stress concentration that applies to the cylinder portion 9*a* by the socket wrench 19.

In addition, since the second depressed portion 14 is formed along the axial direction from the front end portion of each second yoke portion 10*b* up to the position where the second depressed portion 14 faces the nut seating surface 15*a*, a long space on the inner surface side of the second depressed portion 14 can be secured in the axial direction. Thus, when inserting the socket wrench 19 along the stud bolt 17, interference of the socket wrench 19 with the both side surfaces of the second depressed portion 14 can be further suppressed.

Second Embodiment

Figure 9:
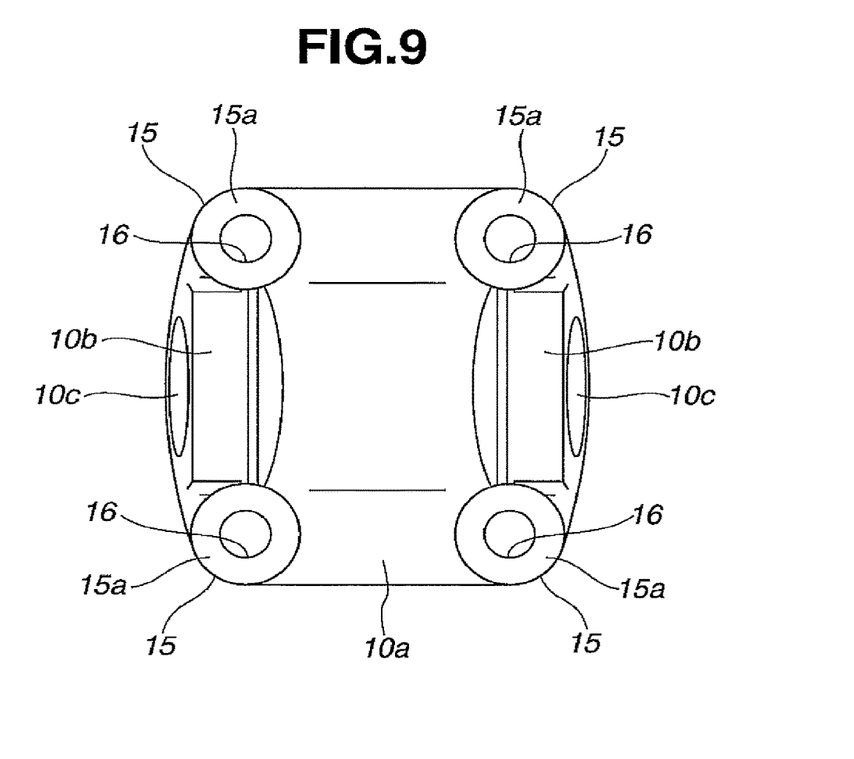
FIG. 9 is a front view of a second yoke according to a second embodiment of the present invention.

FIG. 9 shows a second embodiment. In the second embodiment, a pitch distance between the bolt insertion holes 16 formed at the mounting flange 10*a* is changed. That is, a central angle formed by two positions of the adjoining two bolt insertion holes 16 and 16 that sandwich the second yoke portion 10*b* (i.e. a central angle formed by two positions of the adjoining two bolt insertion holes 16 and 16 that are placed on opposite sides of the second yoke portion 10*b*) is set to 100°, and a central angle formed by two positions of the adjoining two bolt insertion holes 16 and 16 that sandwich no second yoke portion 10*b* is set to 80°.

Thus, according to the present embodiment, the present invention can be applied also to the mounting flange 10*a* where the bolt insertion holes 16 are not arranged uniformly.

Since the other structure of the second embodiment is the same as that of the first embodiment, the same effects as the first embodiment can be obtained.

The position and distance (or interval) of the bolt insertion holes 16 could be changed to an arbitrary numerical value. In some cases, each position of the boss portion 15 formed at the mounting flange 10*a* of the second yoke 10 (the flange yoke 10), i.e. each position of the bolt insertion hole 16, is separate from each of the both side surfaces of the second yoke portion 10*b*. In this case, since the interference of the socket part 19*a* of the socket wrench 19 with the both side surfaces can be avoided, there is no need to form the second depressed portion 14 at the second yoke 10.

Further, although the stud bolt 17 is used when connecting the mounting flange 10*a* and the mounting plate 11*b*, a commonly-used bolt could be used.

The present invention is not limited to the embodiments described above, and the above embodiments can be modified.

From the foregoing, the present invention includes the following structure of the propeller shaft and the yoke structure of the universal joint used for the propeller shaft, and has the following effects.

(a) In the propeller shaft of the present invention, the second yoke has a pair of second yoke portions having a bifurcated shape that extends from the mounting flange toward the first yoke in the axial direction, a securing member seating surface corresponding to a size of the securing member is formed around the bolt insertion hole of the mounting flange, and a second concave portion is provided at each second yoke portion so that the securing member seating surface is visible from a front end side of the second yoke portion.

According to the present invention, since the second concave portion of the arc-shaped groove is formed at the second yoke portion, when inserting and detaching the fastening tool, the fastening tool does not interfere with the second yoke portion, then the efficiency and workability of the connecting work can be increased.

(b) In the propeller shaft, the mounting flange is provided with four bolt insertion holes at a predetermined pitch distance, and the second concave portion is formed at both side surfaces of the second yoke portion, and is shaped into an arc-shaped groove in cross section that extends in a longitudinal direction of the second yoke portion.

According to the present invention, even though the second concave portion is formed at both side surfaces of the second yoke portion, when the cruciform shaft is set into the bearing hole, this structure does not interfere with the cruciform shaft setting work.

(c) In the propeller shaft, the bolt insertion hole is arranged in a position corresponding to a position of the second concave portion formed at the both side surfaces of the second yoke portion, and the second concave portion is formed so that a substantially middle in a width direction of the second concave portion is deepest.

According to the present invention, a strength in a side surface direction of the second yoke portion can be kept uniform.

(d) In the propeller shaft, the four bolt insertion holes are arranged so as to form two predetermined central angles, and a first two of the four bolt insertion holes are arranged in positions that sandwich one of the pair of second yoke portions at a predetermined distance, and a second two of the four bolt insertion holes are arranged in positions that sandwich the other of the pair of second yoke portions with the second two bolt insertion holes spaced a distance that is smaller than the predetermined distance apart from the first two bolt insertion holes, and the second concave portion is formed in a thickness direction of the side surface that is continuously formed on opposing surfaces of the second yoke portion.

According to the present invention, this structure can be applied also to the mounting flange where the bolt insertion holes are not arranged uniformly.

(e) In the propeller shaft, the outer circumferential surface of the fastening tool is cylindrical in shape, and the first concave portions formed into a shape corresponding to the outer circumferential surface of the fastening tool.

According to the present invention, since the first concave portion is formed into the same shape as an outside shape of the fastening tool, even if the fastening tool touches the first concave portion when inserting and detaching the fastening tool, the fastening tool is guided by the first concave portion, then the fastening tool can be inserted and detached smoothly.

(f) In the propeller shaft, the fixing portion is formed by a cylinder portion, and the first concave portion is formed from a front end side of the first yoke portion to a substantially middle position in the axial direction on an outer circumferential surface of the cylinder portion.

According to the present invention, since the first concave portion is formed from the front end side of the first yoke portion to the substantially middle position in the axial direction on the outer circumferential surface of the cylinder portion, an area or a space of the first concave portion can be widely secured in the axial direction. It is therefore possible to suppress the interference of the fastening tool with the first yoke portion when detaching the fastening tool.

(g) In the propeller shaft, the first concave portion is formed so that a depth of the first concave portion gradually becomes deeper up to a predetermined depth from a front end side of the first yoke portion, and a rear end portion of the first concave portion is shaped into an inclined surface having a reverse tapered shape.

According to the present invention, since the rear end portion of the first concave portion is shaped into the inclined surface, the interference of the socket wrench is avoided when detaching the socket wrench, then a stress concentration applying to the rear end portion of the first concave portion by the socket wrench can be decreased.

(h) In the propeller shaft, the inclined surface is a guiding portion when detaching the fastening tool from the nut.

According to the present invention, since the rear end portion of the first concave portion is shaped into the inclined surface, even if the fastening tool touches the first concave portion when detaching the fastening tool, the fastening tool is guided by the first concave portion, then the fastening tool can be detached smoothly.

(i) In the propeller shaft, the first concave portion is formed from a front end portion of the first yoke portion to a substantially middle position in the axial direction on an outer circumferential surface of the cylinder portion.

According to the present invention, since the first concave portions formed from the front end portion of the first yoke portion to the substantially middle position in the axial direction on the outer circumferential surface of the cylinder portion, an area or a space of the first concave portion can be widely secured in the axial direction. It is therefore possible to suppress the interference of the fastening tool with the first yoke portion when detaching the fastening tool.

(j) In the propeller shaft, the flange yoke has a pair of second yoke portions having a bifurcated shape that extends from the flange toward the ball yoke in the axial direction, a nut seating surface is formed around the bolt insertion hole of the flange, and a second concave portion is provided at each second yoke portion so that the nut seating surface is visible from a front end side of the second yoke portion.

(k) In the propeller shaft, the flange is provided with four bolt insertion holes at a predetermined pitch distance, and the second concave portion is formed by a concave groove that extends in the axial direction on both side surfaces of the second yoke portion.

(l) In the yoke structure of the universal joint, the fixing portion is formed by a cylinder portion, and the concave portion is formed from a front end side of the yoke portion to a substantially middle position in the axial direction on an outer circumferential surface of the cylinder portion.

According to the present invention, since the first concave portion is formed from the front end portion of the first yoke portion to the substantially middle position in the axial direction on the outer circumferential surface of the cylinder portion, an area or a space of the first concave portion can be widely secured in the axial direction. It is therefore possible to suppress the interference of the fastening tool with the first yoke portion when detaching the fastening tool.

(m) In the yoke structure of the universal joint, the concave portion is formed so that a depth of the concave portion gradually becomes deeper up to a predetermined depth from a front end side of the yoke portion, and a rear end portion of the concave portion is shaped into an inclined surface having a reverse tapered shape.

According to the present invention, since the rear end portion of the first concave portion is shaped into the inclined surface, the interference of the socket wrench is avoided when detaching the socket wrench, then a stress concentration applying to the rear end portion of the first concave portion by the socket wrench can be decreased.

(n) In the yoke structure of the universal joint, the inclined surface is a guiding portion when detaching the fastening tool from the nut.

According to the present invention, since the rear end portion of the first concave portion is shaped into the inclined surface, even if the fastening tool touches the first concave portion when detaching the fastening tool, the fastening tool is guided by the first concave portion, then the fastening tool can be detached smoothly.

The entire contents of Japanese Patent Application No. 2013-112667 filed on May 29, 2013 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A propeller shaft comprising:
    a shaft part;
    a first yoke having a fixing portion, a connecting portion, a first yoke portion and a first concave portion, wherein
        the first yoke is connected, at the connecting portion, to one end of the shaft part in the direction of the rotation axis of the shaft part,
        the first yoke portion is provided at the fixing portion, and has a shape that extends in the direction of the rotation axis of the shaft part, and
        the first concave portion is provided at the fixing portion so as to accommodate thereon an outer circumferential surface of a fastening tool that fastens the securing member, separate from the connecting portion in the direction of the rotation axis of the shaft part, and has a concave shape that opens toward a radial direction outer side of the rotation axis of the shaft part;

a second yoke having a flange and a second yoke portion, wherein the flange has a bolt insertion hole into which a securing member is inserted, and is connected to a second shaft part of a vehicle side by the securing member, and the second yoke portion is provided at the flange, and has a shape that extends in a direction of a rotation axis of the shaft part; and a cruciform shaft coupling the first yoke portion with the second yoke portion.

2. The propeller shaft as claimed in claim 1, wherein:
the first concave portion is formed astride the fixing portion and the first yoke portion.

3. The propeller shaft as claimed in claim 1, wherein:
the first concave portion is formed so that a middle position, in a circumferential direction of the rotation axis of the shaft part, of the first concave portion is deepest.

4. The propeller shaft as claimed in claim 1, further comprising:
a second concave portion provided at the second yoke portion so as to accommodate thereon the outer circumferential surface of the fastening tool.

5. The propeller shaft as claimed in claim 4, wherein:
the second concave portion is formed at a position opposing to the bolt insertion hole.

* * * * *